UNITED STATES PATENT OFFICE.

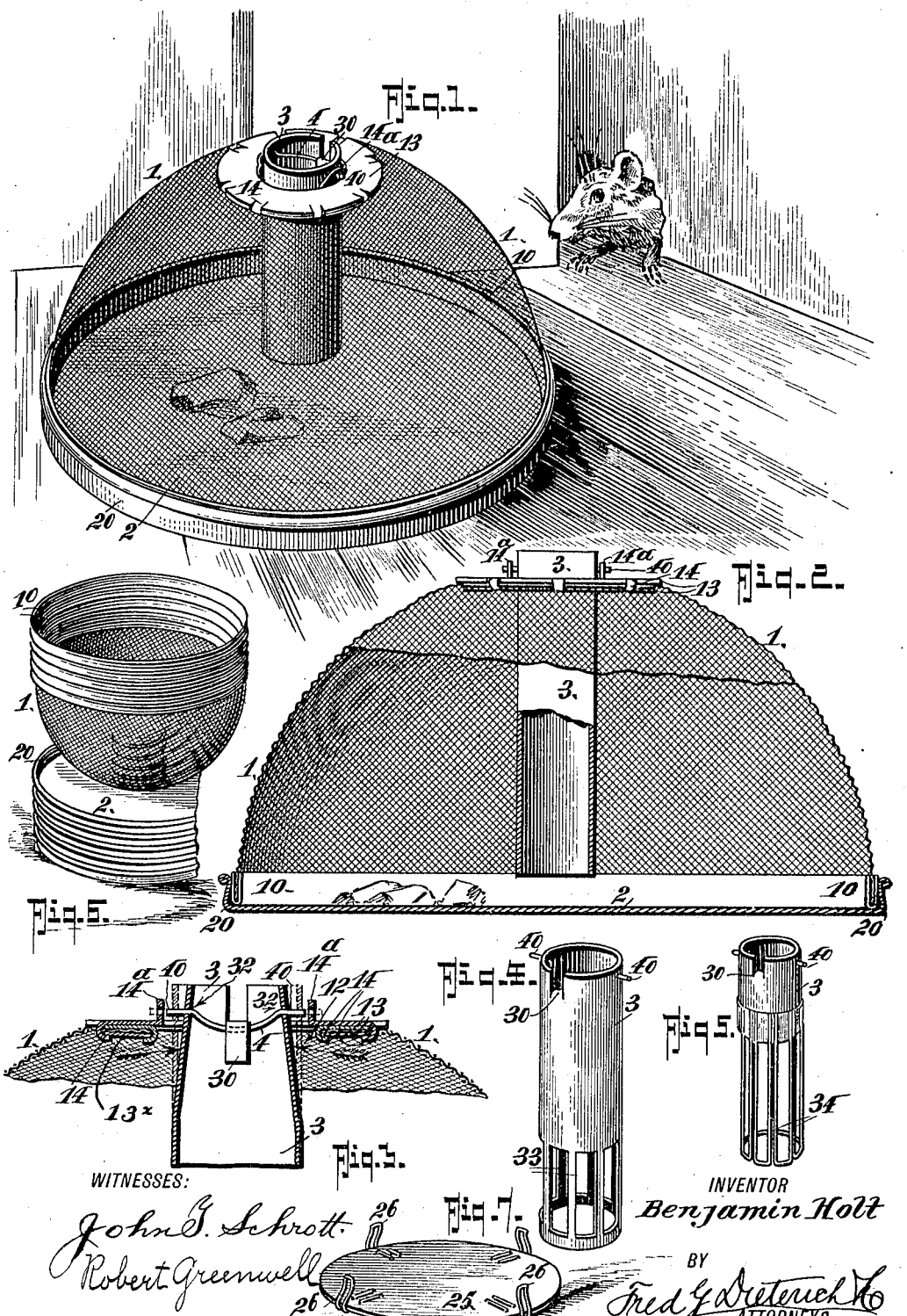

BENJAMIN HOLT, OF ALBION, NEW YORK.

ANIMAL-TRAP.

1,040,329.  Specification of Letters Patent.  Patented Oct. 8, 1912.

Application filed April 25, 1912. Serial No. 693,131.

*To all whom it may concern:*

Be it known that I, BENJAMIN HOLT, residing at Albion, in the county of Orleans and State of New York, have invented a new and Improved Animal-Trap, of which the following is a specification.

This invention, while relating generally to animal traps, is more especially designed for catching mice or rats and it has for its object to provide a trap of the character stated of a simple and inexpensive construction, easily arranged and set for use and in which the several parts have such shape and coöperative connection whereby they can be readily knocked down and compactly folded or packed for storing and shipping.

With other objects in view that will hereinafter appear, my invention comprises an animal trap constructed and arranged in the manner hereinafter fully described, specifically pointed out in the claims and illustrated in the accompanying drawing, in which:

Figure 1, is a perspective view of my trap set up as a mouse catcher. Fig. 2, is a vertical section thereof, parts being in side elevation. Fig. 3, is an enlarged cross section of the upper or entrance end of the trap. Figs. 4 and 5, are perspective views of modified forms of the entrance tube or passage hereinafter referred to. Fig. 6, illustrates how the several parts of my trap may be separated and packed for storing or shipping. Fig. 7, is a perspective view of a modified form of the bottom member hereinafter referred to.

In carrying out my invention, I provide a dome shaped cage 1, the body of which is made of woven wire, the mesh of which varies according to the particular use of which the trap is provided, when for catching mice, as shown in the drawing, the said mesh is fine woven wire. The lower end of the cage is reinforced by a metal band or rim 10 to provide the desired stiffness for the lower edge of the cage.

2 designates the bottom of the trap, which is of sheet metal stamped with an annular verical rim 20 with which the lower or stiffened edge of the cage engages and with which, by reason of its resilience, the said edge interlocks when the parts are assembled for use as shown in Figs. 1 and 2.

By reason of making the body or cage of the trap in the manner stated and the bottom removably but interlockably connectible therewith, the said two parts can be readily separated and a number of the dome shaped bodies 1, nested, as shown in Fig. 6, which also shows how the bottoms 2 may be superimposed for shipping or storing.

The dome of trap 1 has a central opening 12 reinforced by a pair of sheet metal rings 13, each of which has radial fingers or extensions 14 adapted for bending through the wire mesh and for clamping over one another and over a ring 13$^x$ on the underside of the wire mesh whereby to securely clamp the two rings on the dome top. The upper one of the rings 13 has a pair of diametrically opposite vertical ears 14$^a$ at the inner edge, the purpose of which will presently appear.

3 designates the entrance or passage to the interior of the trap and the same, in the simplest form shown in Figs. 1 and 2, consists of a metal tube that is pivotally hung in the upper or entrance end of the cage 1. The tube 3 is of such a length that the lower end hangs closely over the bottom of the cage, as is best shown in Fig. 2, and in such a manner that the rodent in passing down through the tube can work its way out of the tube by reason of the tube swinging in the direction in which the rodent attempts to escape from the said tube into the trap or cage 1. By reason of having the exit of the tube 3 extended closely to the bottom 2, it is impossible for the rodent to crawl under since in making effort to do so it would constantly swing the lower end of the tube away from itself and out of position for escape therethrough. For detachably supporting the tube 3 in the manner stated, I provide a spring wire keeper, the body 4 of which is curved to fit inside of the upper end of the tube and is held clamped therein by the clip 30 cut in the upper end of the tube and bent inwardly and over the said keeper. The ends 40 of the spring wire keeper are bent at right angles and extended through the apertures 32 in the tube to form pintles for engaging the apertured ears 14$^a$—14$^a$.

To disconnect the tube from the cage, for packing and storing, it is only necessary when the bottom 2 is removed from the cage, to squeeze the upper end of the tube to cause the pivot pintles to move inwardly and out of the apertured ears 14$^a$. In shipping the tubes 3 are contained within the nest of the cage member 1.

Instead of using a plain tube 3, as shown in Figs. 1 and 2, the said tube may have the lower end slotted as at 33, see the modified form shown in Fig. 4, or the said lower end may be in the nature of a wire cage 34 as shown by the modified form Fig. 5.

While I prefer, on account of economy in making the same, to have the bottom 2 shaped as shown in Figs. 1 and 2, the said bottom may be a flat disk 25, see Fig. 7, provided with a series of spring clips 26 at the edges for gripping the lower edge of the cage when fitted thereon. The spring clips 26 when the bottoms are packed for shipping, also serve to hold the pack of bottoms secure in their nested position.

By reason of constructing the trap in the manner described and shown, the trap can be made at a small cost and sold cheap, since a large number can be readily nested for shipping and compactly stored.

What I claim is:

1. An animal trap comprising a dome shape cage having a lower rim edge and an opening in the top, a bottom interlockably connectible with the said rim edge, and a tunnel that forms a passage for the animal, the said tunnel being pivotally and removably suspended in the opening in the top of the dome, the said tunnel being of such length whereby its exit is in close proximity to but not in touch with the bottom.

2. An animal trap comprising a cage having an entrance in the top, a tunnel pivotally suspended from the entrance and extending to a point near the bottom of the trap, and means for removably mounting the said tunnel in the entrance of the cage.

3. An animal trap comprising a cage having an entrance in the top, a tunnel pivotally suspended from the entrance and extending to a point near the bottom of the trap, means for removably mounting the said tunnel in the entrance of the cage, the said means consisting of oppositely disposed apertured ears on the cage and a flexible member carried on the upper end of the tunnel and having pintles, the said pintles being projectable into and movable out of said ears whereby to become disconnected from the apertured ears.

BENJAMIN HOLT.

Witnesses:
 LYMAN S. LINSON,
 C. H. DEAN.

---

Copies of this patent may be obtained for five cents each, by addressing the "Commissioner of Patents, Washington, D. C."